US 011235836B2

(12) United States Patent
Inaizumi et al.

(10) Patent No.: US 11,235,836 B2
(45) Date of Patent: Feb. 1, 2022

(54) FRONT-WHEEL SUSPENSION DEVICE FOR SADDLE RIDING VEHICLE

(71) Applicant: HONDA MOTOR CO., LTD., Tokyo (JP)

(72) Inventors: Hideki Inaizumi, Wako (JP); Takahiro Taguma, Wako (JP); Takayuki Kitayama, Wako (JP); Konomu Hoshi, Wako (JP); Hirotaka Nagatani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 16/567,506

(22) Filed: Sep. 11, 2019

(65) Prior Publication Data
US 2020/0102048 A1    Apr. 2, 2020

(30) Foreign Application Priority Data

Sep. 28, 2018   (JP) .............................. JP2018-184554

(51) Int. Cl.
*B62K 25/04*    (2006.01)
*B62K 11/04*    (2006.01)

(52) U.S. Cl.
CPC .............. *B62K 25/04* (2013.01); *B62K 11/04* (2013.01)

(58) Field of Classification Search
CPC ........ B62K 25/04; B62K 25/24; B62K 25/16; B62K 21/20; B62K 21/18; B62K 21/02; B62K 11/12; B62K 11/04
USPC ........................................................ 280/276
See application file for complete search history.

(56) References Cited

U.S. PATENT DOCUMENTS

| 4,433,850 | A  | * | 2/1984  | Miyakoshi | B62K 25/24 180/219 |
| 8,746,721 | B2 | * | 6/2014  | Thiers    | B62K 25/16 280/276 |
| 8,851,221 | B2 | * | 10/2014 | Glover    | B62K 11/04 180/219 |
| 9,359,037 | B2 | * | 6/2016  | Kuwabara  | B62K 21/00 |
| 9,725,127 | B2 | * | 8/2017  | Aoki      | B62K 21/22 |

FOREIGN PATENT DOCUMENTS

| DE | 325034 C       |   | 9/1920  |
| FR | 2878495        |   | 6/2006  |
| JP | 2011-143851 A  |   | 7/2011  |
| JP | 2011143851 A   | * | 7/2011  |
| JP | 2012-192897 A  |   | 10/2012 |

(Continued)

OTHER PUBLICATIONS

Indian Office Action dated Aug. 27, 2020 includes English text, 5 pages.

(Continued)

*Primary Examiner* — Minnah L Seoh
*Assistant Examiner* — Hosam Shabara
(74) *Attorney, Agent, or Firm* — Rankin, Hill & Clark LLP

(57) ABSTRACT

A motorcycle includes: a front swing arm; a fork holder coupled to the front swing arm in a swingable manner; a front fork steerably supported by the fork holder; and a front cushion unit. In a front-wheel suspension device, one end of the front cushion unit is coupled to the body frame, and the other end of the front cushion unit is coupled to the fork holder.

4 Claims, 7 Drawing Sheets

(56) References Cited

FOREIGN PATENT DOCUMENTS

JP          2012192897  A   *  10/2012   ............. B62K 25/24
JP          2016-179796      10/2016

OTHER PUBLICATIONS

Japanese Office Action with English Translation dated Jun. 22, 2021, 7 pages.
German Office Action dated Nov. 18, 2021, English trranslation included, 11 pages.
German Search Report dated Nov. 18, 2021, English translation included, 13 pages.

* cited by examiner

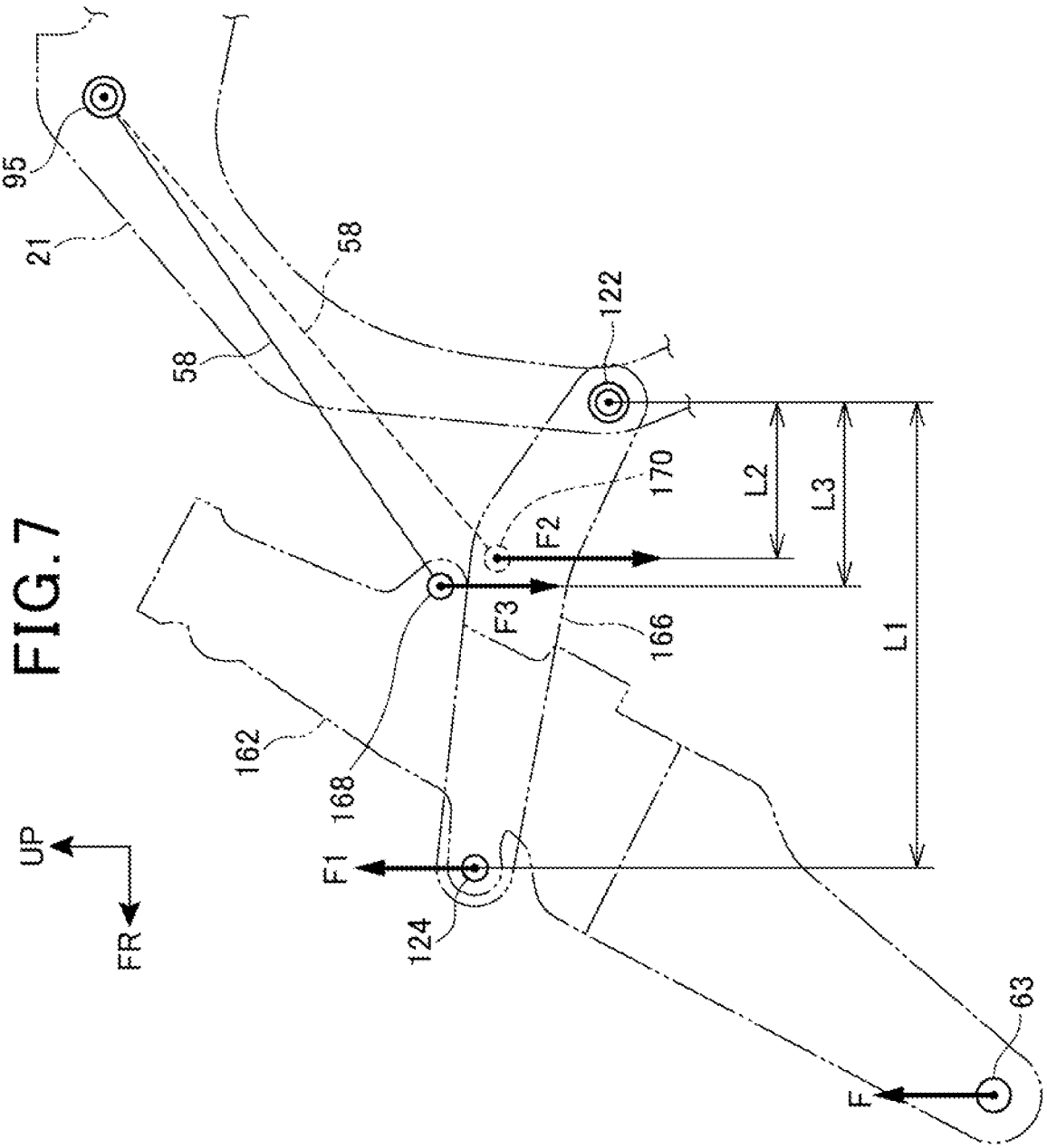

FRONT-WHEEL SUSPENSION DEVICE FOR SADDLE RIDING VEHICLE

INCORPORATION BY REFERENCE

The present application claims priority under 35 U.S.C. § 119 to Japanese Patent Application No. 2018-184554 filed on Sep. 28, 2018. The content of the application is incorporated herein by reference in its entirety.

TECHNICAL FIELD

The present invention relates to front-wheel suspension devices for saddle riding vehicles.

BACKGROUND ART

Conventionally, there are some known front-wheel suspension devices for saddle riding vehicles in which a swing arm is composed of an upper arm and a lower arm and the swing arm connects a body frame and a support member (fork holder) which rotatably supports a front fork, and a cushion member (buffer) spans between the body frame and the lower arm (see, e.g., Patent literature 1).

CITATION LIST

Patent Literature

[Patent Literature 1] JP-A No. 2016-179796

SUMMARY OF INVENTION

Technical Problem

According to Patent Literature 1, the coupling of a lower end of the buffer to the lower arm places a constraint on the shape of the lower arm, and this makes difficult to ensure a clearance between the underside of the lower arm and a shoulder of the front fork which is rotated when the front wheel is steered through the handlebar, and therefore the steering angle of the front wheel is limited. Further, even in the front-wheel suspension device in which the front-wheel side area is supported through the swing arm by the body frame, an improvement in the riding comfort of the vehicle is desired.

It is an object of the present invention to provide a front-wheel suspension device of a saddle riding vehicle in which widening of a steering angle and an increase in riding comfort of the vehicle are achieved.

Solution to Problem

According to a first aspect of the present invention, a front-wheel suspension device of a saddle riding vehicle includes: a swing arm (161) including an upper arm (165) and a lower arm (166) that are mounted to a body frame (11) in a swingable manner; a fork holder (162) that is coupled to the upper arm (165) and the lower arm (166) in a swingable manner; a front fork (53) that is steerably supported by the fork holder (162) and also that supports a front wheel (14); and a buffer (58) that has one end coupled to the body frame (11). In the front-wheel suspension device of the saddle riding vehicle, the buffer (58) has the other end coupled to the fork holder (162).

According to a second aspect of the present invention, the lower arm (166) may be coupled at a coupling site (122) to the body frame (11), and, as viewed in the side view of the vehicle, the coupling site (122) may be placed in front of a cylinder section (68) of an engine (41).

According to a third aspect of the present invention, further, the lower arm (166) may be coupled at a coupling site (122) to the body frame (11), and, as viewed in the side view of the vehicle, the coupling site (122) may be placed forward of a handlebar grasping portion (45d).

According to a fourth aspect of the present invention, further, the fork holder (162) and the buffer (58) may be coupled at a coupling site (168), and, as viewed in the side view of the vehicle, the coupling site (168) may be placed upward of a coupling site (122) of the lower arm (166) to the body frame (11).

According to a fifth aspect of the present invention, further, the coupling site (168) between the fork holder (162) and the buffer (58) may be placed upward of the lower arm (166).

Advantageous Effects of Invention

According to the first aspect of the present invention, because the other end of the buffer is coupled to the fork holder, an increase in the degree of freedom in the design of a shape of the lower arm can be enabled. This facilitates ensuring clearance between the lower arm and a part of the front fork which is rotated when the handlebar is steered, and therefore a wider steering angle can be enabled. Further, the load that acts from a road surface toward the fork holder is divided by the load that acts downward from the lower coupling site of the buffer to the fork holder, and the load ratio (cushion ratio) obtained by the dividing can be increased. This enables an improvement in operability of the buffer, and in turn an improvement in the riding comfort of the vehicle.

According to the second aspect of the present invention, the coupling site of the lower arm to the body frame is placed in front of the cylinder section of the engine as viewed in the side view of the vehicle. Because of this, the lower arm can be located near the cylinder section of the engine so that the front section of the vehicle body can be made compact in size.

According to the third aspect of the present invention, further, the coupling site of the lower arm to the body frame is placed forward of the handlebar grasping portion as viewed in the side view of the vehicle. Because of this, the front section of the vehicle body can be made compact in size by placing the lower arm near the rider who holds the handlebar grasping portions.

According to the fourth aspect of the present invention, further, as viewed in the side view of the vehicle, the coupling site between the fork holder and the buffer is placed upward of the coupling site of the lower arm to the body frame. Because of this, when one end of the buffer is attached to or detached from the fork holder, the buffer can be readily attached to or detached from the fork holder from above, and thus the working efficiency can be improved.

According to the fifth aspect of the present invention, further, because the coupling site between the fork holder and the buffer is placed upward of the lower arm, the buffer can be readily attached to or detached from the fork holder, and thus the working efficiency can be improved.

BRIEF DESCRIPTION OF DRAWINGS

FIG. 7 is an action diagram illustrating the action of the front-wheel suspension device (the second embodiment).

DESCRIPTION OF EMBODIMENTS

Embodiments according to the present invention will now be described with reference to the accompanying drawings. It is noted that, throughout the description, words for directions such as front, rear, left, right, upward and downward are used in conformity with directions with respect to the vehicle body unless otherwise stated. Also, in each drawing, a reference sign FR denotes the front of the vehicle body, a reference sign UP denotes the upper side of the vehicle body and a reference sign LH denotes the left of the vehicle body.

First Embodiment

Figure 1:
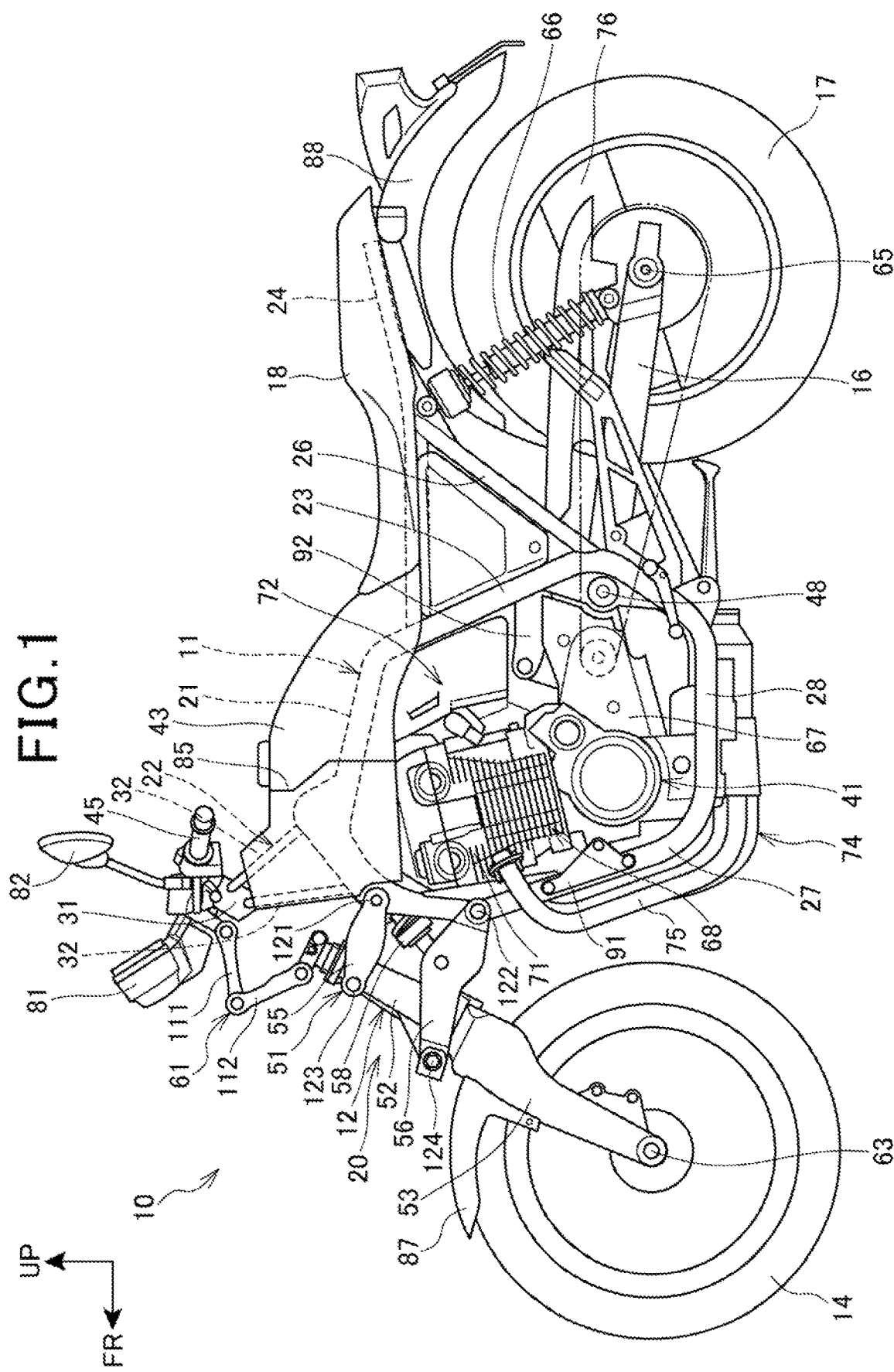
FIG. 1 is a left side view illustrating a motorcycle including a front-wheel suspension device according to a first embodiment of the present invention.

FIG. 1 is a left side view illustrating a motorcycle 10 including a front-wheel suspension device 20 according to a first embodiment of the present invention.

The motorcycle 10 includes: a front wheel 14 that is supported at a front portion of a body frame 11 through a front swing mechanism 12; a rear wheel 17 that is supported at a rear portion of the body frame 11 through a rear swing arm 16; and a seat 18 that is supported on an upper portion of the body frame 11. The motorcycle 10 is a saddle riding vehicle on which a rider and a pillion passenger sit astride the seat 18.

The body frame 11 includes a pair of left and right upper frames 21, a top frame 22, a pair of left and right pivot frames 23, a pair of left and right seat frames 24, a pair of left and right sub-frames 26, a pair of left and right down frames 27, and a pair of left and right lower frames 28.

The left and right upper frames 21 are placed above an engine 41, and the upper frames 21 are bent in an upward protruding shape. A fuel tank 43 is supported on upper portions of the upper frames 21. The top frame 22 is composed of: a head pipe 31 that forms an upper end; and a plurality of head-pipe support frames 32 that are attached to the left and right upper frames 21 to support the head pipe 31. The head pipe 31 supports rotatably a handlebar steering shaft 46 on which a handlebar 45 is mounted (see FIG. 3).

The left and right pivot frames 23 extend downward from rear ends of the upper frames 21, and the pivot frames 23 support a pivot shaft 48 that extends in a vehicle width direction. The left and right seat frames 24 extend rearward from upper ends of the left and right pivot frames 23, to support the seat 18.

Each of the left and right sub-frames 26 connects the corresponding pivot frame 23 and the corresponding seat frame 24. The left and right down frames 27 extend respectively downward and obliquely rearward from lower front ends of the respective left and right upper frames 21. The left and right down frames 27 also support the engine 41 in cooperation with the left and right pivot frames 23. The left and right lower frames 28 extend respectively rearward from lower ends of the left and right down frames 27, so that the rear ends of the lower frames 28 are connected to the lower ends of the respective left and right pivot frames 23.

The front swing mechanism 12 is configured to include: a front swing arm 51 that is supported at the front portion of the body frame 11 in a swingable manner; a fork holder 52 that is coupled to the front swing arm 51 in a swingable manner; and a front fork 53 that is supported by the fork holder 52 in a rotatable manner.

The front swing arm 51 is configured to include: a pair of left and right upper arms 55 that couple upper portions of the left and right upper frames 21 and an upper portion of the fork holder 52; and a pair of left and right lower arms 56 that couple the lower ends of the left and right upper frames 21 and a lower portion of the fork holder 52.

The fork holder 52 is a cylindrical shaped member, and tilts rearward such that the upper end is located in a more rearward position of the vehicle than the lower end.

The front fork 53 has an upper portion inserted into the fork holder 52, and thus the front fork 53 is rotatably supported by the fork holder 52. The upper end of the front fork 53 is coupled to the handlebar 45 through a link mechanism 61, and the front wheel 14 is supported at the lower end of the front fork 53 through an axle 63.

A front cushion unit 58 serving as a buffer is placed to span between the left and right upper frames 21 and the left and right lower arms 56.

The aforementioned front swing mechanism 12 (the front swing arm 51, the fork holder 52, the front fork 53) and the front cushion unit 58 form a front-wheel suspension device 20 that suspends the front wheel 14.

A front end of the rear swing arm 16 is attached to the pivot shaft 48 in a vertically swingable manner, and the rear wheel 17 is supported at a rear end of the rear swing arm 16 through an axle 65.

A pair of left and right rear cushion units 66 serving as buffers is placed to span between the left and right rear ends of the rear swing arms 16 and the left and right of the rear portion of the body frame 11, respectively.

The engine 41 includes a crankcase 67 and a cylinder section 68 that extends upward and obliquely forward from a front portion of the crankcase 67, and the engine 41 includes a cylinder head 71 on the cylinder section 68. An intake device 72 is connected to a rear side of the cylinder head 71, and the intake device 72 includes an air cleaner and/or the like. An exhaust device 74 is connected to a front side of the cylinder head 71. The exhaust device 74 includes a plurality of exhaust pipes 75 which are connected to the cylinder head 71, and the exhaust device 74 also includes a muffler 76 connected to the rear end of the plurality of exhaust pipes 75.

The handlebar 45 is mounted with a meter 81 and a pair of left and right rearview mirrors 82.

An upper portion of the body frame 11 and a front portion of the fuel tank 43 are covered from the lateral sides with a pair of left and right front covers 85.

The front wheel 14 is covered from above with a front fender 87, while the rear wheel 17 is covered from above with a rear fender 88.

Figure 2:
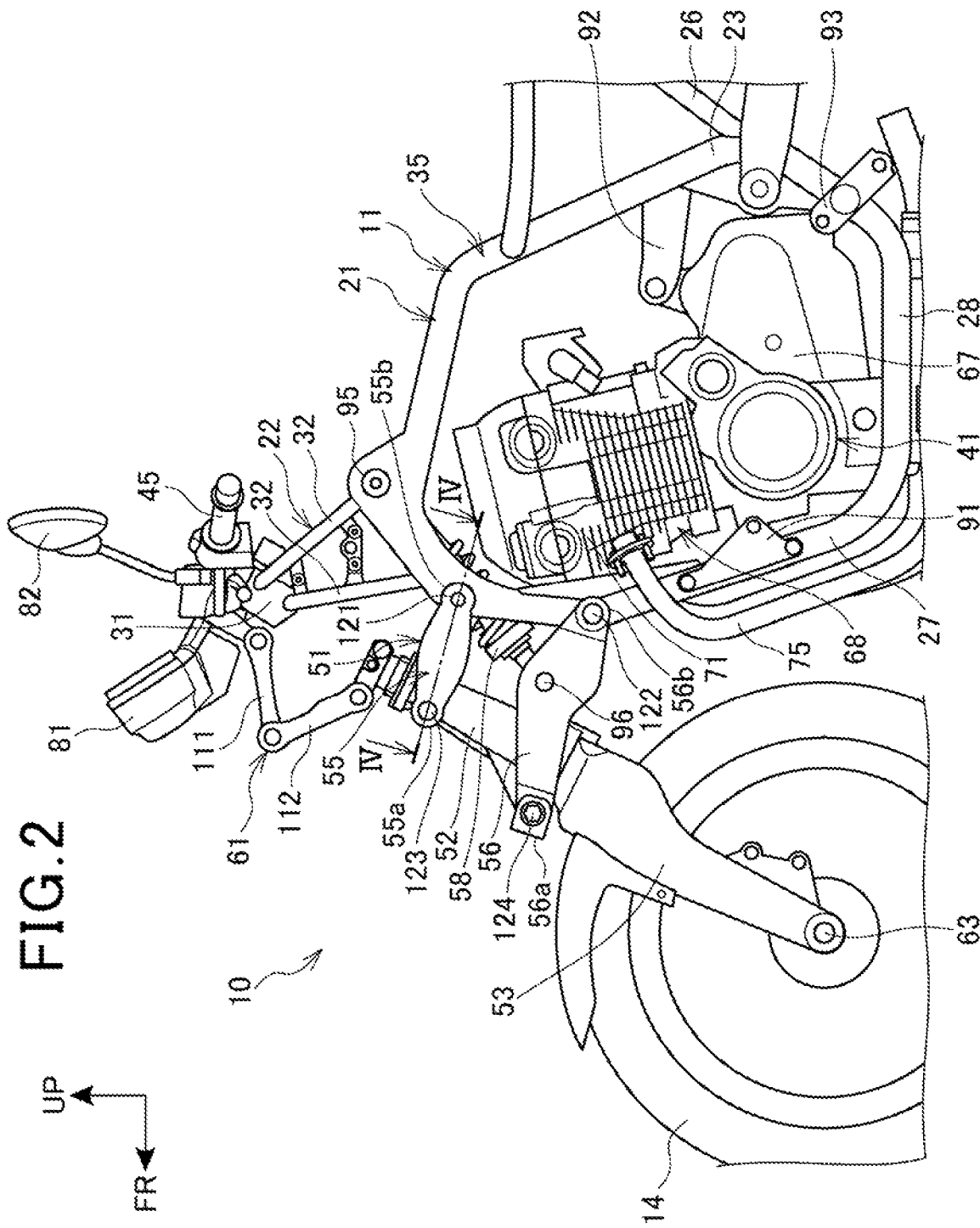
FIG. 2 is a left side view illustrating a front body section of the motorcycle (the first embodiment).

FIG. 2 is a left side view illustrating a front body section of the motorcycle 10 (the first embodiment).

The body frame 11 includes a pair of left and right tubular loop-shaped frames 35 each of which is shaped endlessly to surround the engine 41. The top frame 22 is attached to upper portions of the left and right loop-shaped frames 35.

The left and right loop-shaped frames 35 are configured to include the pair of left and right upper frames 21, the pair of left and right pivot frames 23, the pair of left and right down frames 27, and the pair of left and right lower frames 28. The left and right loop-shaped frames 35 are connected by a plurality of cross pipes (not shown) which extend in the vehicle width direction.

The engine 41 has a front portion supported by a pair of left and right front engine hangers 91 that are provided respectively on the left and right down frames 27. The engine 41 also has a rear portion supported by a pair of left and right upper rear engine hangers 92 and a pair of left and right lower rear engine hangers 93, the left and right upper rear engine hangers 92 and the left and right lower rear engine hangers 93 being correspondingly provided on the left and right pivot frames 23.

Each of the left and right upper arms 55 is formed in a linear shape. A front end 55a of the upper arm 55 is coupled to an upper portion of the fork holder 52, and a rear end 55b of the upper arm 55 is coupled to an upper portion of the corresponding upper frame 21.

Each of the left and right lower arms 56 is formed in an upward protruding bent shape. A front end 56a of the lower arm 56 is coupled to a lower portion of the fork holder 52, and a rear end 56b of the lower arm 56 is coupled to a lower end of the corresponding upper frame 21.

An upper end 58b of the front cushion unit 58 is coupled to an upper connecting shaft 95 in a swingable manner, and the upper connecting shaft 95 spans between the left and right upper frames 21. A lower end 58a of the front cushion unit 58 is coupled to a lower connecting shaft 96 in a swingable manner, and the lower connecting shaft 96 spans between the left and right lower arms 56.

Figure 3:
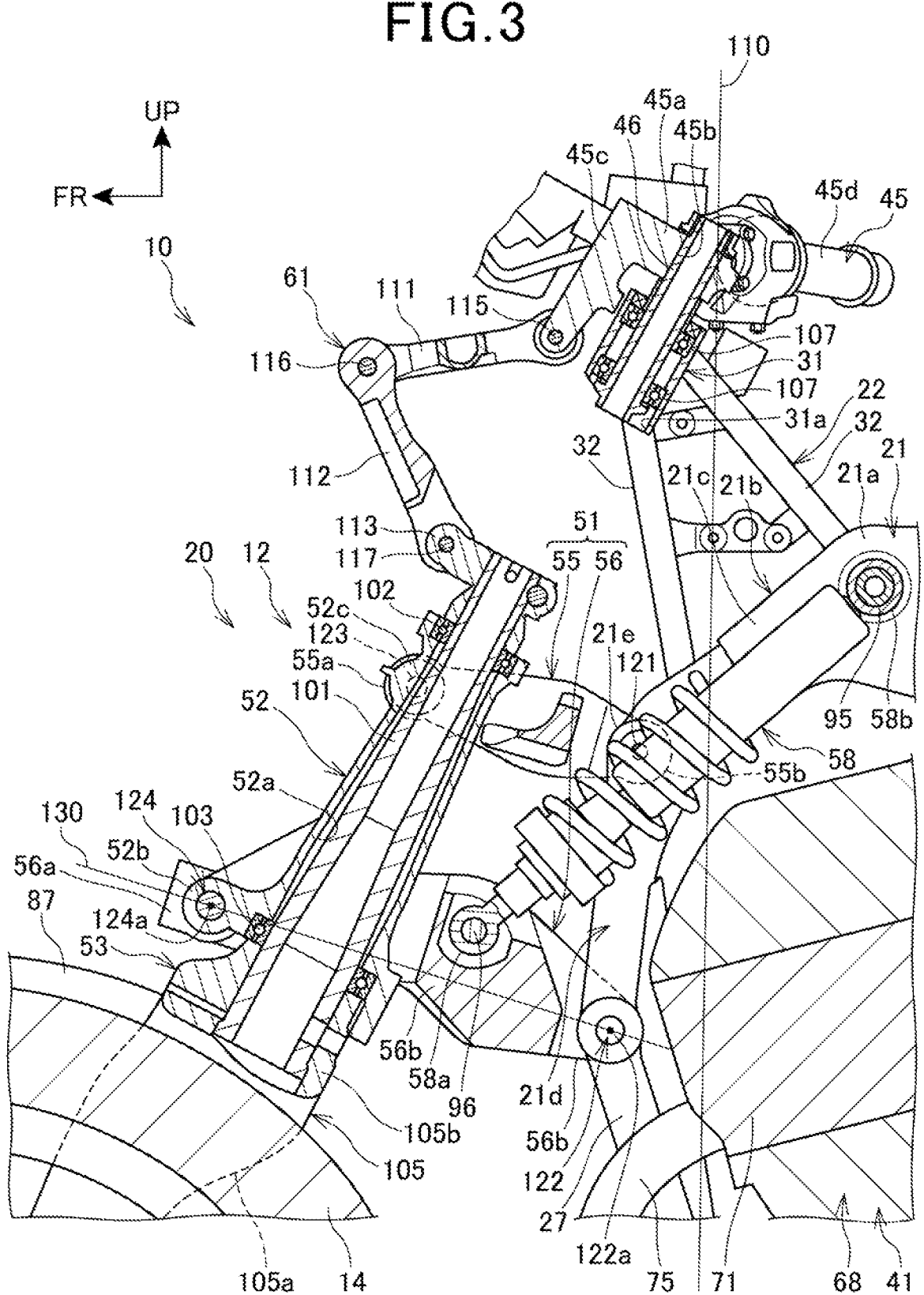
FIG. 3 is a sectional view of the front body section (the first embodiment).

FIG. 3 is a sectional view of the front body section (the first embodiment), and FIG. 3 shows a vertical section taken along a vehicle axis extending in the front-rear direction while passing through the center in the vehicle width direction of the motorcycle 10.

The fork holder 52 includes a hollow portion 52a that is gradually increased in internal diameter as the hollow portion 52a extends from the upper end toward the lower end. A front-wheel steering shaft 101 is rotatably inserted into the hollow portion 52a.

The front-wheel steering shaft 101 is a tubular member that is gradually increased in external diameter as the front-wheel steering shaft 101 extends from the upper end toward the lower end. The front-wheel steering shaft 101 is rotatably supported through a pair of bearings 102, 103 by the fork holder 52.

The front fork 53 is configured to include the front-wheel steering shaft 101 and a fork lower member 105 that is secured to the lower end of the front-wheel steering shaft 101.

The fork lower member 105 is integrally formed to include: a pair of left and right arm portions 105a having lower ends at which the axle 63 (see FIG. 1) is mounted; and a cross portion 105b connecting upper ends of the respective left and right arm portions 105a.

An axis line serves as a rotational axis of the front-wheel steering shaft 101, and an inclination angle of the axis line from a vertical line is a caster angle θ.

In the embodiment, because the upper arm 55 and the lower arm 56 have different entire lengths, when the front wheel 14 is vertically moved relative to the body frame 11, the caster angle θ varies. The depicted state such as of the inclination angles of the upper arm 55 and the lower arm 56, the caster angle θ, and/or the like, illustrates the state where the body weight is applied to the front-wheel suspension device 20 and also no occupant rides on (so-called "unloaded vehicle IG condition") (ditto for other figures).

The head pipe 31 includes a hollow portion 31a, and the head pipe 31 is a tubular member that tilts rearward such that the upper end is located in a more rearward position of the vehicle than the lower end. The rearward-tilting handlebar steering shaft 46 is inserted into the hollow portion 31a. The handlebar steering shaft 46 is rotatably supported through a pair of bearings 107 by the head pipe 31. The handlebar 45 is mounted to the handlebar steering shaft 46.

The handlebar 45 has a handlebar base 45a provided at the center in the vehicle width direction, and the handlebar 45 is provided in the handlebar base 45a with: a shaft throughhole 45b that is fitted over the handlebar steering shaft 46; and an L-shaped arm 45c that is formed in a L-shape extending integrally in the forward direction and the downward direction of the vehicle.

The L-shaped arm 45c is placed in front of the head pipe 31. The link mechanism 61 is coupled to the lower end of the L-shaped arm 45c and to the upper end of the front-wheel steering shaft 101.

The link mechanism 61 is configured to include an upper link 111 and a lower link 112. The upper link 111 has one end coupled to the L-shaped arm 45c in a swingable manner, and the lower link 112 is coupled to both the other end of the upper link 111 and the upper end of the front-wheel steering shaft 101 in a swingable manner.

Specifically, a link support member 113 is attached to the upper end of the front-wheel steering shaft 101, and the lower link 112 is coupled to a front end of the link support member 113 in a swingable manner.

The upper end of the upper link 111 is coupled through a connecting shaft 115 to the L-shaped arm 45c in a swingable manner. The lower end of the upper link 111 and the upper end of the lower link 112 are coupled together through a connecting shaft 116 in a swingable manner. The lower end of the lower link 112 is coupled through a connecting shaft 117 to the link support member 113 in a swingable manner.

The upper frame 21 includes a tilt portion 21b that extends forward and obliquely downward from an uppermost portion 21a while bending, the uppermost portion 21a being placed in an uppermost position of the upper frame 21. The tilt portion 21b is configured to include an upper tilt portion 21c and a lower tilt portion 21d. The upper tilt portion 21c extends forward and obliquely downward from the uppermost portion 21a, and the lower tilt portion 21d extends forward and obliquely downward at a steeper angle than the upper tilt portion 21c from a lower end of the upper tilt portion 21c. A connection point between the upper tilt portion 21c and the lower tilt portion 21d is a bending bend portion 21e.

The lower arm 56 includes a bend portion between the upper frame 21 and the fork holder 52 in the vehicle longitudinal direction, the bend portion bending in an upward protruding shape.

The upper end 58b of the front cushion unit 58 is coupled through the upper connecting shaft 95 to the uppermost portion 21a of the upper frame 21. The lower end 58a of the front cushion unit 58 is also coupled through the lower connecting shaft 96 to the bend portion of the lower arm 56.

The front cushion unit 58 extends along the tilt portion 21b (specifically, the upper tilt portion 21c) of the upper frame 21, and also the front cushion unit 58 overlaps the tilt portion 21b (specifically, the upper tilt portion 21c and an upper portion of the lower tilt portion 21d) as viewed in the side view of the vehicle.

The rear end 55b of the upper arm 55 is coupled through a connecting shaft 121 to the bend portion 21e of the upper frame 21 in a swingable manner. Also, the rear end 56b of the lower arm 56 is coupled through a connecting shaft 122 to the lower end of the lower tilt portion 21d in a swingable manner. The connecting shaft 121 overlaps the front cushion unit 58 as viewed in the side view of the vehicle.

The front end 55a of the upper arm 55 is coupled through a connecting shaft 123 to an upper portion of the fork holder 52 in a swingable manner. The connecting shaft 123 overlaps the front-wheel steering shaft 101 as viewed in the side view of the vehicle.

The front end 56a of the lower arm 56 is coupled through a connecting shaft 124 to a frontward protrusion 52b in a swingable manner, and the frontward protrusion 52b is integrally formed on a lower portion of the fork holder 52.

Each of the upper arms 55 and the lower arms 56 is positioned upward toward the front. The connecting shaft 123 is located upward of the connecting shaft 121, and the connecting shaft 124 is located upward of the connecting shaft 122.

The lower connecting shaft 96 is located upward of a straight line 130 that passes through axes 122a, 124a (points indicated with filled circles) of the respective connecting shafts 122, 124 on the lower arm 56. The lower connecting shaft 96 is also located upward of the connecting shaft 122.

The handlebar 45 includes grips 45d placed at both the left and right ends of the handlebar 45 in order for the rider to hold the grips 45d. As viewed in the side view of the vehicle, the connecting shaft 122 on the rear end 56b of the lower arm 56 is located forward of a vertical line 110 that extends vertically through the front end of the corresponding grip 45d.

Figure 4:
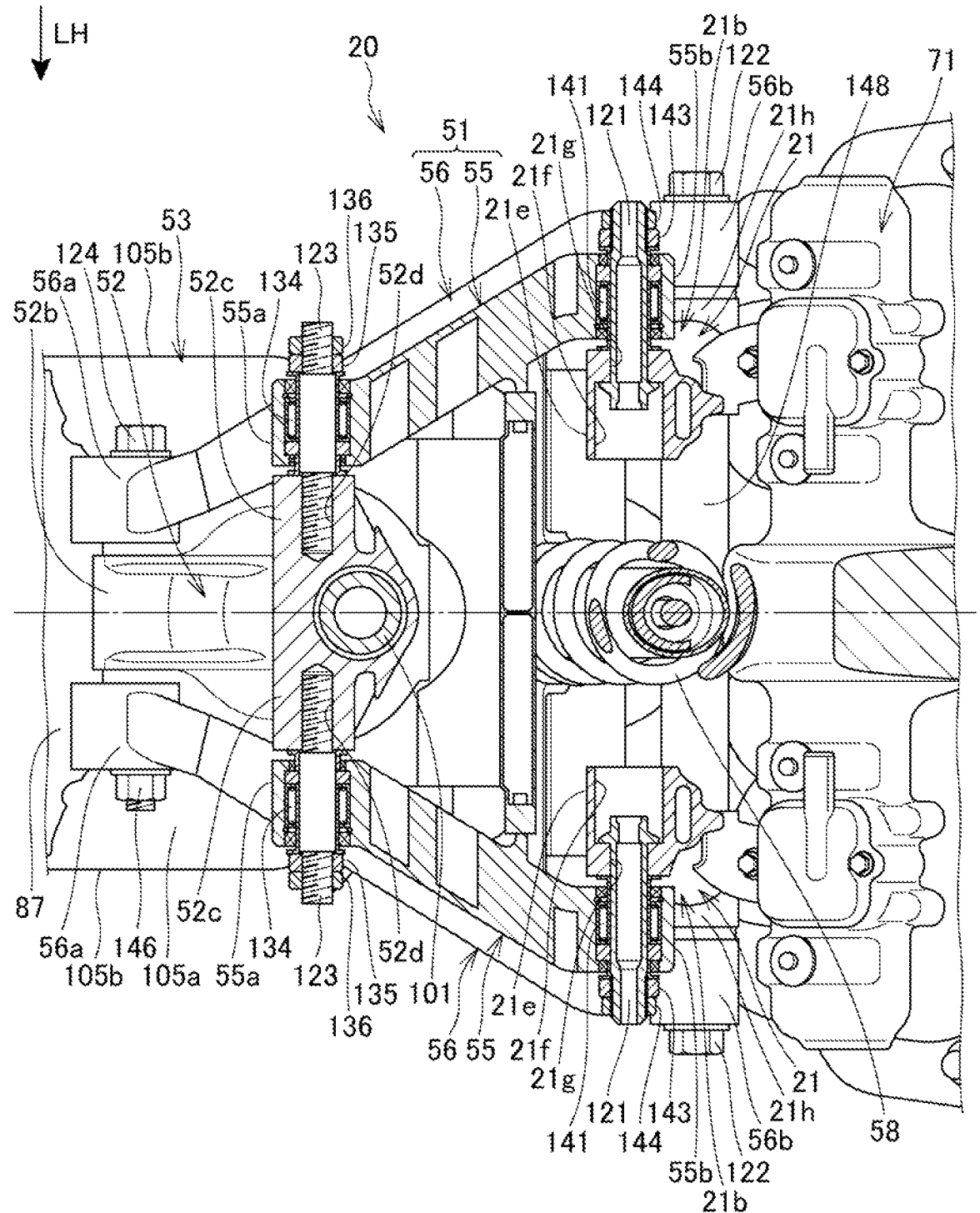
FIG. 4 is a sectional view taken along IV-IV line of FIG. 2 (the first embodiment).

FIG. 4 is a sectional view taken along IV-IV line of FIG. 2 (the first embodiment), FIG. 4 being a cutaway view along a plane passing through the left and right connecting shafts 121, 123.

The fork holder 52 integrally includes a pair of left and right sideward extended portions 52c that extend from the center in the vehicle width direction toward the outside in the vehicle width direction. Internal threads 52d are formed respectively in the left and right sideward extended portions 52c.

The connecting shafts 123, which are formed of stud bolts, are screwed respectively into the internal threads 52d of the respective left and right sideward extended portions 52c, and the front ends 55a of the upper arms 55 are coupled respectively through bearings 134 to the left and right connecting shafts 123 in a swingable manner. The front-wheel steering shaft 101 is placed between the left and right connecting shafts 123.

As illustrated in FIG. 3 and FIG. 4, the left and right sideward extended portions 52c overlap the front-wheel steering shaft 101 as viewed in the side view of the vehicle. Further, the connecting shafts 123 also overlap the front-wheel steering shaft 101 as viewed in the side view of the vehicle.

Conventionally, a connecting shaft for coupling each of the left and right upper arms to a fork holder is located forward of a front-wheel steering shaft. However, in the embodiment, the left and right connecting shafts 123 are placed on both sides in the vehicle width direction of the front-wheel steering shaft 101, and thereby the left and right connecting shafts 123 are placed in more rearward positions of the vehicle than the convention.

This enables a reduction in entire length of each of the left and right upper arms 55 to increase the rigidity of the upper arms 55 (in particular, the torsional rigidity when the left and right upper arms 55 are twisted, and the laterally flexural rigidity), and therefore higher rigidity of the front-wheel suspension device 20 can be achieved. Further, by shortening the entire length of each of the left and right upper arms 55, the front-wheel suspension device 20 may be made smaller in size, compact.

The left and right upper arms 55 and the left and right lower arms 56 are arranged such that the distance between the upper arms 55 and the distance between the lower arms 56 taper down gradually toward the front of the vehicle. Also, the pair of left and right upper arms 55 and the pair of left and right lower arms 56 are arranged at a vertical distance from each other (see also FIG. 3), and also vertically overlap each other. The left and right upper arms 55 are arranged along the left and right lower arms 56.

In order to prevent the front ends 55a of the respective left and right upper arms 55 from coming out of the connecting shafts 123, each front end 55a is retained by a nut 135 and a locknut 136 which are screwed onto the end of the connecting shaft 123.

A hollow portion 21f and a bolt through hole 21g are formed in the tilt portion 21b (specifically, the bend portion 21e) of each of the left and right upper frames 21, and the bolt through hole 21g extends outward in the vehicle width direction from the bottom of the hollow portion 21f to pass through the tilt portion 21b in the vehicle width direction.

The rear end 55b of each of the left and right upper arms 55 is attached to the tilt portion 21b in a swingable manner by the bolt-shaped connecting shaft 121, a nut 143 and a locknut 144, the bolt-shaped connecting shaft 121 being passed through the bolt through hole 21g of the tilt portion 21b, the nut 143 and the locknut 144 being screwed onto the end of the connecting shaft 121.

The front ends 56a of the respective left and right lower arms 56 are arranged on both sides of the frontward protrusion 52b of the fork holder 52, and the front ends 56a are coupled together by the bolt-shaped connecting shaft 124 that passes through the front end 56a, the frontward protrusion 52b and the front end 56a. A nut 146 is screwed onto the end of the connecting shaft 124.

The rear ends 56b of the lower arms 56 are coupled through the bolt-shaped connecting shaft 122 to boss portions 21h that are formed respectively on sides of lower ends in the tilt portions 21b of the respective left and right upper frames 21. The left and right boss portions 21h are placed on an extension line of a front cross pipe 148 that extends in the vehicle width direction to span between the left and right upper frames 21.

The cylinder head 71 is placed at the rear of the front cross pipe 148.

Second Embodiment

Figure 5:
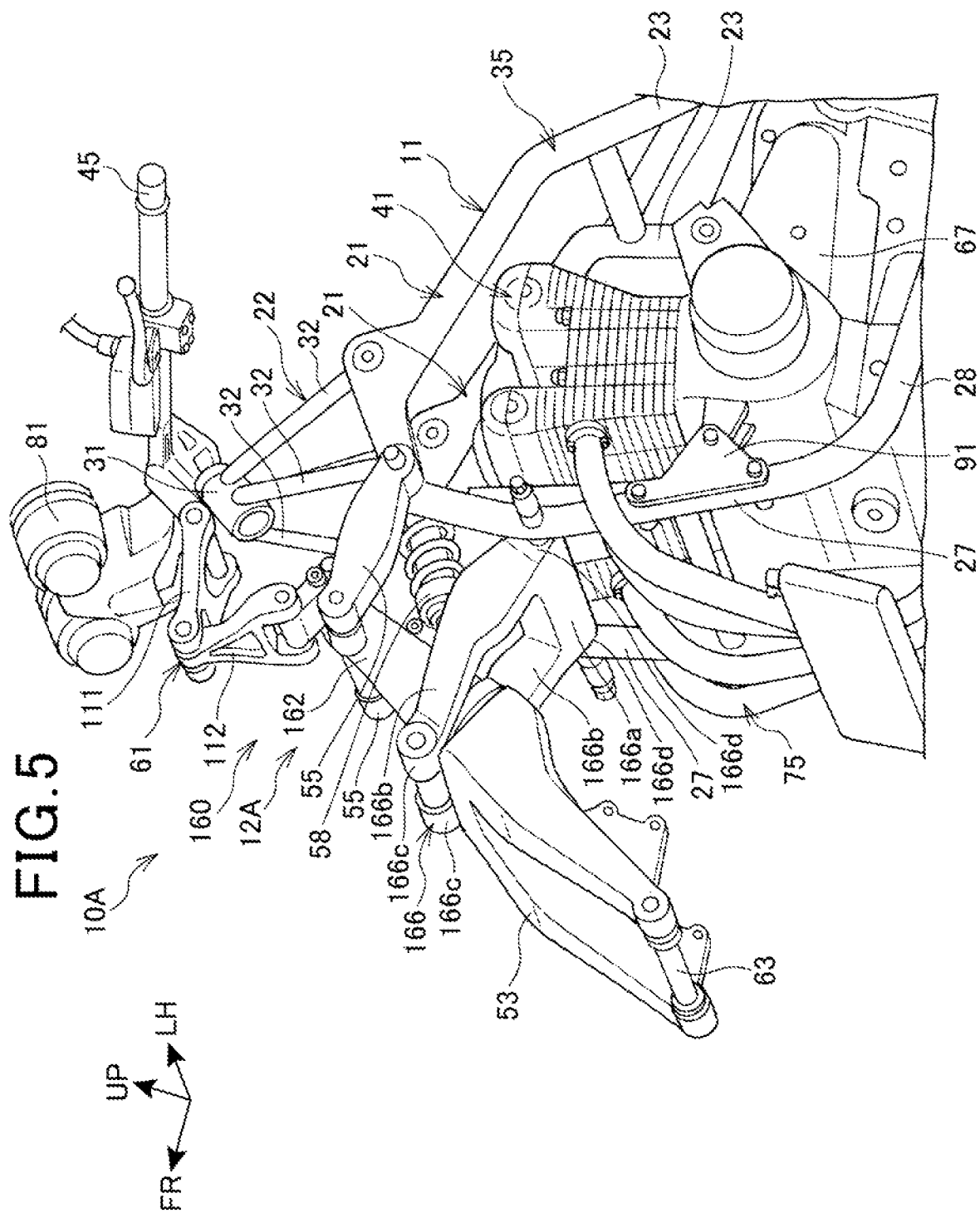
FIG. 5 is a perspective view illustrating a front body section of a motorcycle including a front-wheel suspension device according to a second embodiment.

FIG. 5 is a perspective view illustrating a front body section of a motorcycle 10A including a front-wheel suspension device 160 according to a second embodiment. In the second embodiment, like reference signs are used to refer to like components in the first embodiment, and details are omitted.

The front-wheel suspension device 160 differs in a front swing mechanism 12A from the front-wheel suspension device 20 in the first embodiment.

The front swing mechanism 12A is configured to include a front swing arm 161, a fork holder 162, and the front fork 53. Also, the front swing mechanism 12A and the front cushion unit 58 form the front-wheel suspension device 160.

The front swing arm 161 is composed of the upper arm 55 and a lower arm 166, the upper arm and the lower arm 166 being supported in a front portion of the body frame 11 in a swingable manner.

The upper arm is identical with the upper arm 55 (see FIG. 1) in the first embodiment, but the different reference signs are used for distinction.

The lower arm 166 is integrally formed to include: a lateral extended portion 166a that extends in the vehicle width direction; and a pair of left and right frontward extended portions 166b that extend forward from both ends of the lateral extended portion 166a.

Front ends 166c of the respective left and right frontward extended portions 166b are coupled through the connecting shaft 124 to a lower portion of the fork holder 162. Ends 166d on both sides of the lateral extended portion 166a are coupled respectively through the connecting shafts 122 to the lower ends of the tilt portions 21b of the left and right upper frames 21.

The connecting shafts 122 are located in front of the cylinder section 68 (specifically, the cylinder head 71) of the engine 41 as viewed in the side view of the vehicle.

The fork holder 162 is provided with a coupling site (not shown) located in a rear portion, and the front cushion unit 58 is coupled to the coupling site.

Figure 6:
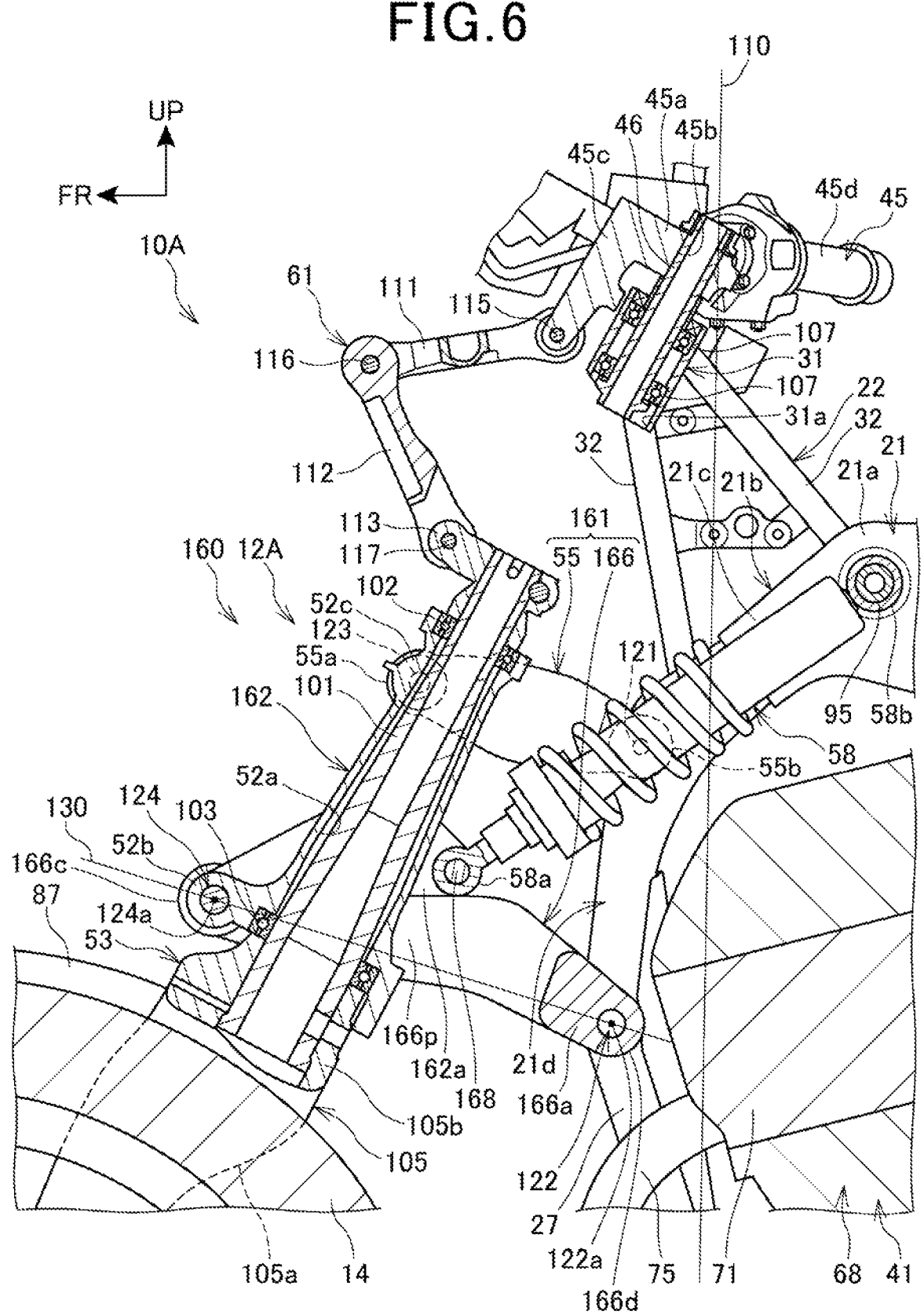
FIG. 6 is a sectional view illustrating the front-wheel suspension device (the second embodiment).

FIG. 6 is a sectional view illustrating the front-wheel suspension device 160 (the second embodiment), and FIG. 6 shows a vertical section taken along a vehicle axis extending in the front-rear direction while passing through the center in the vehicle width direction of the motorcycle 10A.

The fork holder 162 differs only in a rearward protrusion 162a from the fork holder 52 (see FIG. 3) in the first embodiment.

The rearward protrusion 162a is a portion protruding rearward from a rear portion of a middle portion in the longitudinal direction of the fork holder 162. The lower end 58a of the front cushion unit 58 is coupled through the lower connecting shaft 168 to the rearward protrusion 162a in a swingable manner.

The lower connecting shaft 168 is located upward of the connecting shaft 122, and the lower connecting shaft 168 is also located upward of the straight line 130. Further, the lower connecting shaft 168 is located upward of the lower arm 166.

In an upper portion of the fork holder 162, the fork holder 162 integrally includes a pair of left and right sideward extended portions 52c that extend outward in the vehicle width direction from a central portion in the vehicle width direction, as in the case of the fork holder 52, in FIG. 4. The internal threads 52d are formed respectively in the left and right sideward extended portions 52c. The connecting shafts 123 are screwed into the left and right internal threads 52d, and the front ends 55a of the upper arm are coupled through the bearings 134 to the left and right connecting shafts 123 in a swingable manner, respectively.

As described above, by coupling the front cushion unit 58 to the fork holder 162, the fork holder 162 with high strength and high rigidity can be used to support the front cushion unit 58, and thus the strength and rigidity of the front-wheel suspension device 160 can be increased. Further, the lower end 58a of the front cushion unit 58 is placed in a further frontward position of the vehicle, so that the entire length of the front cushion unit 58 can be longer to increase the stroke of the front cushion unit 58. As a result, the riding comfort of the motorcycle 10A can be improved.

The lower arm 166 differs from the lower arm 56 (see FIG. 4) in the first embodiment in that no lower connecting shaft 96 (see FIG. 3) is provided for coupling the front cushion unit 58. In this manner, because a shaft through hole for insertion of the lower connecting shaft 96 is not formed in the lower arm 166, the strength and rigidity of the lower arm 166 can be increased.

The front end 166c of the lower arm 166 is coupled to the frontward protrusion 52b of the fork holder 162 through the connecting shaft 124, and each end 166d of the lower arm 166 is coupled to the lower end of the tilt portion 21b of the upper frame 21 through the connecting shaft 122.

The connecting shaft 122 is located forward of the vertical line 110 passing through the front end of the grip 45d, as viewed in the side view of the vehicle.

FIG. 7 is an action diagram illustrating the action of the front-wheel suspension device 160 (the second embodiment).

It is noted that the upper frame 21, the fork holder 162 and the lower arm 166 are indicated by a dash-dot-dot line, and the front cushion unit 58 is schematically shown by a solid line or a broken line. The solid line shows the front cushion unit 58 of an example (the embodiment) where the lower end of the front cushion unit 58 is coupled to the fork holder 162. The broken line shows the front cushion unit 58 of a comparative example where the lower end of the front cushion unit 58 is coupled to the lower arm 166.

Assuming that: L1 is the distance between the connecting shaft 122 and the connecting shaft 124 of the lower arm 166; L2 is the distance between the connecting shaft 170 and the connecting shaft 122 if the lower end of the front cushion unit 58 is coupled to the lower arm 166; and L3 is the distance between the connecting shaft 122 and the lower connecting shaft 168. Note that the distances L1, L2, L3 are distances in the front-rear direction.

If the lower end of the front cushion unit 58 is coupled to the fork holder 162 as in the example, in compared with the case where the front cushion unit 58 is coupled to the lower arm 166 as in the comparative example, no interference occurs between the connecting shaft and the fork holder 162. Because of this, L3>L2 can be held.

The following is a description of action occurring, for example, when the fork holder 162, together with the axle 63 of the front wheel, is to be moved upward relative to the upper frames 21.

Assume, in the comparative example and the example, that the load acting upward from the axle 63 is F, and the load acting upward on the connecting shaft 124 of the lower arm 166 is F1, and assume, in the comparative example, that the load acting downward from the connecting shaft 170 is F2. Then, a load balance is expressed by the following:

$$F=F1 \quad (1)$$

$$F1 \cdot L1 = F2 \cdot L2 \quad (2)$$

Also, assume, in the example, that the load acting downward from the lower connecting shaft 168 is F3. Then, a load balance with respect to the upper connecting shaft 95 as a base point is expressed by the following:

$$F1=F3 \quad (3)$$

From the above equations (2) and (3), in the comparative example, F2=F1*(L1/L2) can be given, and in the example, F3=F1 can be given. In turn, from these equations, F2=F3*(L1/L2) results. Because of L1>L2, F2>F3 results. Also, for a cushion ratio, (F/F2)<(F/F3) results.

In this manner, the cushion load F3 of the front cushion unit 58 in the example is smaller than the cushion load F2 of the front cushion unit 58 in the comparative example.

Also, the cushion ratio (F/F3) in the example is larger than the cushion ratio (F/F2) in the comparative example.

From the above, in the example, the absorption of impact energy is facilitated and thus the ride comfort can be improved as compared with the comparative example.

As illustrated above in FIG. 5 and FIG. 6, the motorcycle 10 as a saddle riding vehicle includes the front swing arm 161 as a swing arm, the fork holder 162, the front fork 53, and the front cushion unit 58 as a buffer.

The front swing arm 161 is composed of the upper arms and the lower arms 166, the upper arms and the lower arms 166 being mounted to the body frame 11 in a swingable manner. The fork holder 162 is coupled to the upper arms and the lower arms 166 in a swingable manner. The front fork 53 is steerably supported by the fork holder 162, and also the front fork 53 supports the front wheel 14. The front cushion unit 58 has one end coupled to the body frame 11. In the front-wheel suspension device 160, the other end of the front cushion unit 58 is coupled to the fork holder 162.

With the configuration, because the front cushion unit 58 is coupled directly to the fork holder 162, an increase in the degree of freedom in the design of a shape of the lower arm 166 can be enabled. This results in the facilitation of the ensuring of clearance between the lower arms 166 and a part of the front fork 53 which is rotated when the handlebar 45 is steered, and thus the steering angle of the front wheel 14 can be widened. Further, the load F that acts from a road surface toward the fork holder 162 is divided by the load F3 that acts downward from the lower coupling site 168 which is a coupling site of the front cushion unit 58 to the fork holder 162, and the load ratio (cushion ratio) F/F3 thus obtained by the dividing can be increased with respect to a load ratio (cushion ratio) F/F2 in the comparative example. This enables an increase in the cushion ratio of the front-wheel suspension device 160 to improve the operability of the front cushion unit 58, and in turn the riding comfort of the motorcycle 10A can be improved.

As illustrated in FIG. 6, also, the connecting shaft 122 as a coupling site of the lower arm 166 to the body frame 11 is placed in front of the cylinder section 68 (specifically, the cylinder head 71) of the engine 41 as viewed in the side view of the vehicle.

With the configuration, the lower arm 166 is located near the cylinder section 68 of the engine 41 so that the front section of the vehicle body can be made compact in size.

Also, as viewed in the side view of the vehicle, the connecting shaft 122, which is a coupling site of the lower arm 166 to the body frame 11, is placed forward of the grip 45d as a handlebar grasping portion.

With the configuration, the front section of the vehicle body can be made compact in size by placing the lower arm 166 near the rider who holding the grips 45d.

Also, as viewed in the side view of the vehicle, the lower connecting shaft 168 as a coupling site between the fork holder 162 and the front cushion unit 58 is placed upward of the connecting shaft 122 as a coupling site of the lower arm 166 to the body frame 11.

With the configuration, when one end of the front cushion unit 58 is attached to or detached from the fork holder 162, the attachment/detachment of the front cushion unit 58 to/from the fork holder 162 can be readily performed from above the lower arm 166, and thus the working efficiency can be improved.

Also, the lower connecting shaft 168 as a coupling site between the fork holder 162 and the front cushion unit 58 is placed upward of the lower arm 166.

With the configuration, the attachment/detachment of the front cushion unit 58 to/from the fork holder 162 can be readily performed from above the lower arm 166, and thus the working efficiency can be improved.

The embodiments have been described to provide a merely illustrative embodiment of the present invention, and thus any modification and any application of the present invention can be possible without departing from the spirit and scope of the present invention.

For example, in the above embodiments, as illustrated in FIG. 4 and FIG. 6, the pair of left and right sideward extended portions 52c are placed in the upper portion of the fork holder 52, 162, and the left and right sideward extended portions 52c extend in the vehicle width direction, and the front ends of the left and right upper arms 55 (or the left and right upper arm 165) are coupled to the left and right sideward extended portions 52c through the connecting shafts 123, respectively. Likewise, a pair of left and right sideward extended portions extending in the vehicle width direction may be provided in a lower portion of the fork holder 52, 162, and the front ends of the left and right lower arms 56, 166 may be coupled to the sideward extended portions through the connecting shafts 124, respectively. In this case, the sideward extended portions and the connecting shafts 124 may be placed to overlap the front-wheel steering shaft 101 as viewed in the side view of the vehicle.

REFERENCE SIGNS LIST

10A . . . Motorcycle (saddle riding vehicle)
11 . . . Body frame
14 . . . Front wheel
41 . . . Engine
45 . . . Handlebar
45d . . . Grip (handlebar grasping portion)
53 . . . Front fork
58 . . . Front cushion unit (buffer)
61 . . . Link mechanism
71 . . . Cylinder head
122 . . . Connecting shaft (coupling site)
160 . . . Front-wheel suspension device
161 . . . Front swing arm (swing arm)
162 . . . Fork holder
166 . . . Lower arm
168 . . . Lower connecting shaft (coupling site)

The invention claimed is:

1. A front-wheel suspension device of a saddle riding vehicle, comprising:
   a swing arm including left and right upper arms and a lower arm that are mounted to a body frame in a swingable manner;
   a fork holder that is coupled to the left and right upper arms and the lower arm in a swingable manner;
   a front fork that is steerably supported by the fork holder and supports a front wheel; and
   a buffer that has one end coupled to the body frame and an other end coupled to the fork holder,
   the fork holder is a cylindrical shaped member that is in a hollow cylindrical shape and that extends in an upward-downward direction, a front-wheel steering shaft that forms an upper portion of the front fork is disposed in an inside of a cylinder of the cylindrical shaped member and rotatably supported to the cylindrical shaped member, the left and right upper arms and the lower arm are coupled to the fork holder in a swingable manner in front of a rotational axis of the front-wheel steering shaft, the fork holder has a rearward protrusion protruding rearward from a rear surface of the cylindrical shaped member, the other end of the buffer is coupled to the rearward protrusion in a swingable manner, the buffer passes between the left and right upper arms disposed at left and right sides of the buffer and extends upward and the one end is connected to the body frame, the rearward protrusion is placed upward of the lower arm.

2. The front-wheel suspension device of the saddle riding vehicle according to claim 1, wherein the lower arm is coupled at a coupling site to the body frame, and, as viewed in a side view of the vehicle, the coupling site is placed forward of a handlebar grasping portion.

3. The front-wheel suspension device of the saddle riding vehicle according to claim 1, wherein the rearward protrusion and the buffer are coupled at a coupling site, and, as viewed in a side view of the vehicle, said coupling site is placed upward of a coupling site of the lower arm to the body frame.

4. The front-wheel suspension device of the saddle riding vehicle according to claim 1, wherein the lower arm is coupled at a coupling site to the body frame, and, as viewed in a side view of the vehicle, the coupling site is placed in front of a cylinder section of an engine.

\* \* \* \* \*